(12) United States Patent
Brezden et al.

(10) Patent No.: US 11,506,007 B2
(45) Date of Patent: Nov. 22, 2022

(54) MANIFOLD FOR HYDRAULIC FRACTURING BLENDER AND OTHER APPLICATIONS

(71) Applicant: TY-CROP MANUFACTURING LTD., Rosedale (CA)

(72) Inventors: James Ryan Brezden, Lindell Beach (CA); Kevin Brent Thiessen, Rosedale (CA); Brent Douglas Van Kleeck, Chilliwack (CA); Kevin James Standeven, Rosedale (CA)

(73) Assignee: Ty-Crop Manufacturing Ltd., Rosedale (CA)

( * ) Notice: Subject to any disclaimer, the term of this patent is extended or adjusted under 35 U.S.C. 154(b) by 0 days.

(21) Appl. No.: 16/833,414

(22) Filed: Mar. 27, 2020

(65) Prior Publication Data
US 2020/0325743 A1 Oct. 15, 2020

Related U.S. Application Data

(60) Provisional application No. 62/833,046, filed on Apr. 12, 2019.

(51) Int. Cl.
| | | |
|---|---|---|
| *E21B 21/10* | (2006.01) | |
| *E21B 21/12* | (2006.01) | |
| *E21B 34/06* | (2006.01) | |
| *F16L 39/02* | (2006.01) | |
| *E21B 21/06* | (2006.01) | |

(52) U.S. Cl.
CPC .............. *E21B 21/12* (2013.01); *E21B 21/10* (2013.01); *E21B 34/063* (2013.01); *F16L 39/02* (2013.01); *E21B 21/062* (2013.01)

(58) Field of Classification Search
CPC ........ E21B 33/04; E21B 33/068; E21B 33/06; E21B 33/12; E21B 33/03; E21B 34/16; E21B 21/08; E21B 44/04; E21B 17/01; E21B 21/12; E21B 34/063; E21B 21/10; E21B 21/062; F16L 39/02
See application file for complete search history.

(56) References Cited

U.S. PATENT DOCUMENTS

| | | | | |
|---|---|---|---|---|
| 4,570,673 | A * | 2/1986 | Kendrick | ................ E21B 21/02 137/615 |
| 9,255,469 | B2 * | 2/2016 | Conrad | .................... E21B 34/00 |
| 2013/0140872 | A1 * | 6/2013 | Jeffrey | .................. E21B 33/127 299/16 |
| 2015/0322761 | A1 * | 11/2015 | Hodgson | ................. E21B 43/26 166/308.1 |
| 2018/0187507 | A1 * | 7/2018 | Hill | ....................... E21B 33/068 |

* cited by examiner

*Primary Examiner* — Taras P Bemko
(74) *Attorney, Agent, or Firm* — Burr & Brown, PLLC

(57) ABSTRACT

A modular fluid-carrying manifold apparatus is provided for use in hydraulic fracturing blenders and other devices. A manifold can include one or more interchangeable sections. Each section may have a flat front face with ports cut into the front face. Components such as valves and hammer unions are directly removably connected to the ports via bolts. This eliminates the need for welded-on piping. Removable, wear-resistant inserts can be located in the ports. The removable components may be considered consumable and replaced when worn out.

21 Claims, 13 Drawing Sheets

MANIFOLD FOR HYDRAULIC FRACTURING BLENDER AND OTHER APPLICATIONS

CROSS REFERENCE TO RELATED APPLICATIONS

This application claims the benefit of priority to U.S. Patent Application Ser. No. 62/833,046 entitled "MANIFOLD FOR HYDRAULIC FRACTURING BLENDER AND OTHER APPLICATIONS" filed Apr. 12, 2019, which is hereby incorporated by reference in its entirety.

FIELD OF THE INVENTION

The present invention pertains to the field of fluid-handling manifolds, and in particular to components in a manifold subject to breakdown, for example in hydraulic fracturing blenders.

BACKGROUND

In hydraulic fracturing operations, a fracturing fluid, such as a sand/water slurry, is driven into an oil and gas well at high pressure. The fluid, which can include various chemicals and materials in addition to proppant (e.g. sand) mixed in water, can be significantly abrasive. The fluid is initially mixed from its constituent materials in a blender, and then transferred to a fracturing apparatus for pumping into the well. The blender typically includes intake manifolds for receiving water and other liquids to be blended, one or more blending or mixing tubs, and discharge-side manifolds for providing the produced fluid, as well as other components such as proppant/sand screws and dry feeders. The manifolds typically include multiple externally connectable ports for collecting or dispensing fluid, along with at least one internal port for internally directing the fluid to or from the ports.

Fluid-handling parts of the hydraulic fracturing system in general, and the blender in particular, are subject to wear. Current manifolds are typically made from sections of pipe or hollow structural sections (HSS) with cut-outs. The cut-outs have short (e.g. 4 inch) pipes welded on. The pipes end in flanges at which valves (e.g. butterfly valves) and unions (e.g. hammer unions), or other connectors or block-off plates may be attached.

The manifolds are typically mounted outboard of the machinery they are installed on, and are often placed near or at the maximum width or length requirements for the machinery. The current common method of constructing a manifold, by welding on pipes and flanges, contributes to width of the manifold and is not ideal.

The current common method of constructing manifolds somewhat limits the material choice to common metals and alloys that are available to purchase as tubes, pipes, or HSS (hollow structural sections).

Due to heavy-duty usage in potentially harsh environments, and the abrasive nature of the fracturing fluid or parts thereof, the manifolds are subject to wear and failure. Wear may be due to washouts and erosion and is frequent at the ports of the manifold. Washouts in this context refer to a worn condition interior to a manifold. Replacement of a worn or failed manifold is a difficult process, and leads to expense and downtime. Manifolds are typically custom built with significant amounts of welding, which is labour intensive. They are difficult to manufacture, inspect and replace, and failure at one port typically necessitates replacement of the entire manifold. The welds are particular subject to cracking, due to the washouts as well as hammering of the hammer unions.

Manifolds often require several ports (10 or more), and as a result can be quite long and heavy and difficult to both handle and mount on machinery.

Therefore there is a need for a manifold that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a fluid handling manifold having a wear-resistant and/or consumable and replaceable component and usable for example on a blender unit in a hydraulic fracturing operation.

In accordance with embodiments of the present invention, there is provided a fluid-carrying manifold apparatus comprising: a body having an interior cavity, the body comprising a front portion having one or more ports formed therein, and the ports communicating with the interior cavity; and one or more components attached (e.g. removably bolted or otherwise removably or non-removably attached) to the front portion overtop of the one or more ports. The components can include valves, unions (e.g. hammer unions), other connections such as process connections, blind flanges, blanking plugs, or other components such as plates, or combinations thereof. The components can include other components that are attachable to the ports. The components can be attached directly to the front portion, rather than via other components such as short sections of pipe extending from the ports. The front portion may be a plate, casting, or other piece, which is flat, rounded, or contoured, and which is shaped so as to allow the attachment of the components thereto. One or more inserts, for example wear-resistant or consumable and replaceable inserts, may be respectively fitted within the one or more ports and held in place therein, for example pressed between a ridge within the port and a valve attached (e.g. bolted) onto the port.

In accordance with embodiments of the present invention, there is provided a manifold assembly comprising at least two interchangeable manifold apparatuses each as described above and elsewhere herein.

In accordance with embodiments of the present invention, there is provided a machine, comprising a manifold having at least one manifold apparatus as described above and elsewhere herein. The machine may further include at least one second manifold apparatus which is interchangeable with the at least one manifold apparatus. In some embodiments, different ones of the apparatuses may belong to an intake manifold of the machine and a discharge-manifold of the machine.

In accordance with embodiments of the present invention, there is provided a machine, such as a blender unit, comprising an intake manifold and a discharge-side manifold, the intake manifold having at least one first manifold apparatus as described above and elsewhere herein, and the discharge-side manifold having at least one second apparatus as described above and elsewhere herein, the at least one first apparatus and the at least one second apparatus being interchangeable.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
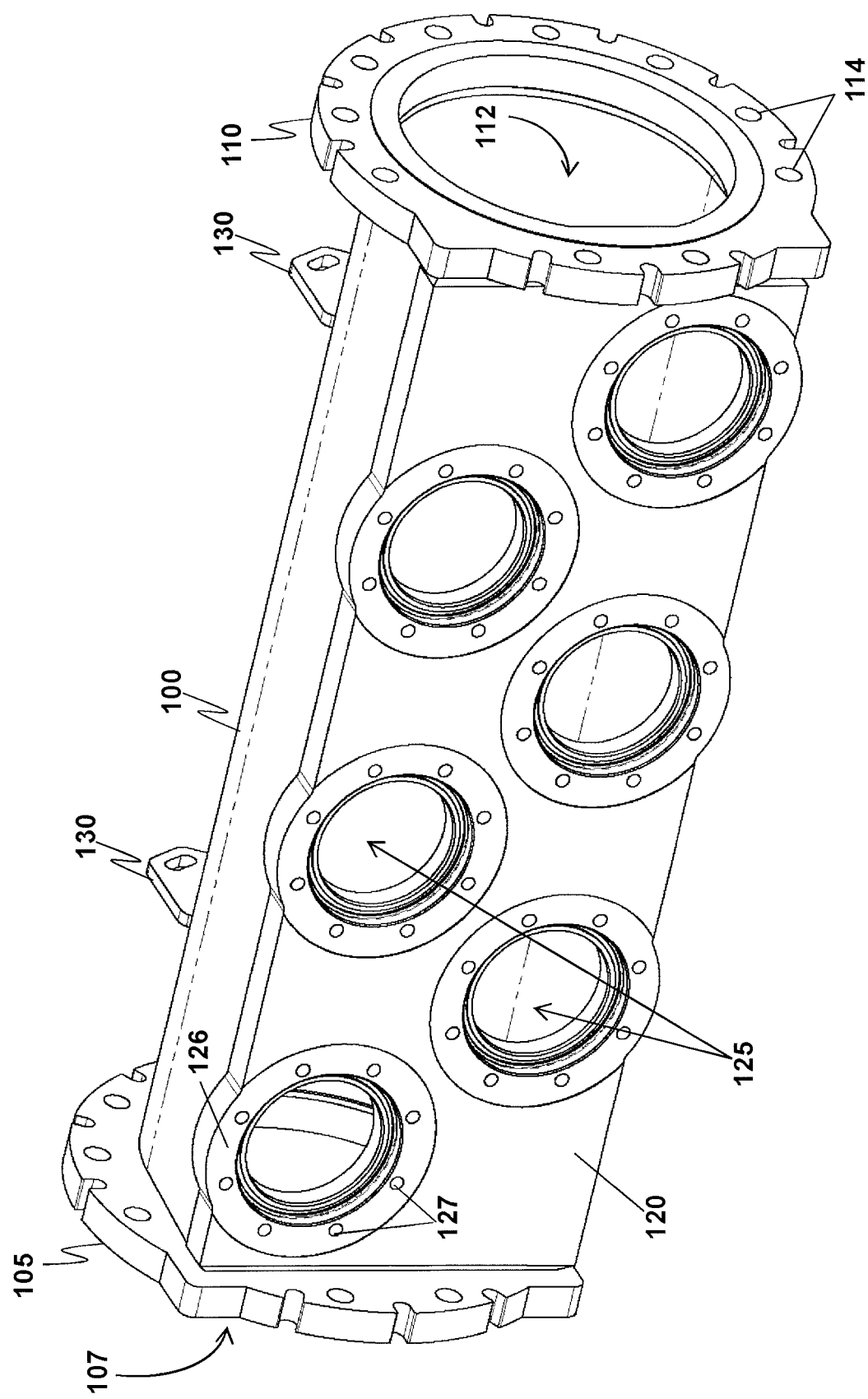
FIG. 1 illustrates a manifold base section according to an embodiment of the present invention.

Embodiments of the present invention provide a fluid handling manifold having a wear-resistant and/or consumable and replaceable component and usable for example on a blender unit in a hydraulic fracturing operation. Rather than having header pipes welded to the manifold as in the prior art, the manifold is formed with a front portion having apertures formed therein, and further components attached (e.g. bolted) directly on to the front portion's outer surface. The further components can include one or more valves, unions, connections such as process connections, blind flanges (also referred to as block off plates), blanking plugs, or the like, or combinations thereof. As used herein and elsewhere, unions may be hammer unions or other types of unions. The front portion may be burned, which refers to cutting of the plate or other piece on a CNC burn table, for example using plasma, laser or water jet. The front portion may be a plate, such as a substantially flat plate with a substantially flat outer surface. This facilitates receiving the attached components. The bolt-on (or other removable attachment) configuration allows for easier replacement of specific parts, rather than the entire manifold. It should be noted that the plate may be a separate, flat metal piece (e.g. plate or casting), or may be a flat portion of a larger curved metal piece.

In some embodiments, the front portion is not necessarily flat. Rather, the front portion may have a curved or contoured outer surface. The amount of curvature or shape of the outer surface may be configured to still allow for attachment of the components (e.g. valves and hammer unions) in a sealing engagement with the front portion. In some embodiments, the front portion is still substantially flat, e.g. having a large radius of curvature. In some embodiments, the front portion is less curved (e.g. has a larger radius of curvature) than the remainder of the manifold outer casing.

The manifold can be formed from relatively short sections. Multiple parts of the overall manifold can be connected together. Multiple sections of manifold can be connected together in some cases to form an extended manifold.

According to various embodiments, an insert is provided and located within at least one of the apertures of the manifold. Such apertures can be referred to as ports. In some embodiments the insert is removable and replaceable. Multiple such inserts can be provided. The insert acts as an interface between the manifold's front portion (e.g. front plate) and the valve (or union) attached thereto. The insert may be a hardened or coated insert made of steel or another wear-resistant material, such as manganese steel, tungsten carbide, or ceramic, engineered plastic, or another hardened or wear-resistant material or combination of materials. Soft materials which are shown to be potentially wear resistant in a slurry environment may also be used in some embodiments. The insert may be machined to seal with an O-ring or other fluid seal. In some embodiments, the insert itself may be made of a material or combination of materials to allow it to act as a fluid seal. That is, the insert may include materials around its edges which fluidically sealingly engage with the manifold. The components, such as the insert, valve, and union, can be removed when worn, and rotated to a different position when uneven wear occurs, or replaced when necessary.

It is noted that, by forming the manifold from corresponding raw materials, a relatively wide variety of metals or alloys, including less common materials that are harder or abrasion-resistant, can be used in the construction of embodiments of the present invention.

In some embodiments, the insert is not necessarily removable or replaceable. For example, when the insert is sufficiently wear-resistant to allow the manifold to operate for the life of the equipment, the insert may be permanently included within the aperture(s). For example, the insert may be trapped in place using welds or another substantially permanent fixture method.

FIG. 1 illustrates a manifold base section according to an embodiment of the present invention. The base section includes a hollow body 100 with flanges 105, 110 on either end. The flanges 105, 110 surround apertures 107, 112 which communicate with an interior cavity. The base section includes a front plate 120, having a flat front face, which forms one boundary of the hollow body. The remaining boundaries of the hollow body may be formed using a curved (e.g. C-shaped or U-shaped) body or other flat or curved faces. The boundaries enclose the interior cavity to contain fluid therein. A plurality of ports 125 are formed in the front plate 120. The ports 125 can be generally circular in shape and can be configured to hold wear-resistant inserts and O-rings or other fluid seals, as will be described below. The ports are surrounded by threaded holes 127, formed in the front plate and spaced at regular intervals and to which bolts can be affixed. The flanges 105, 110 can similarly be surrounded by threaded holes to which bolts can be affixed.

Portions 126 of the front plate 120 surrounding the ports 125 and holes 127 can be polished, burnished or machined to a smooth finish to allow for a tight seal when other components are affixed thereto. Mounting brackets 130 may also be connected (e.g. welded) to the body 100. The fluid seals can be fitted onto the inserts or otherwise made to be in contact with the inserts upon assembly.

Accordingly, the front plate may have a depth and surface area sufficient to accommodate machined cavities (e.g. ports 125) configured to receive the inserts, along with the holes 127. The front plate may further have a surface area sufficient to accommodate the fastening points of components such as valves, unions, process connections, blind flanges, blanking plugs, plates, or combinations thereof.

Figure 2A:
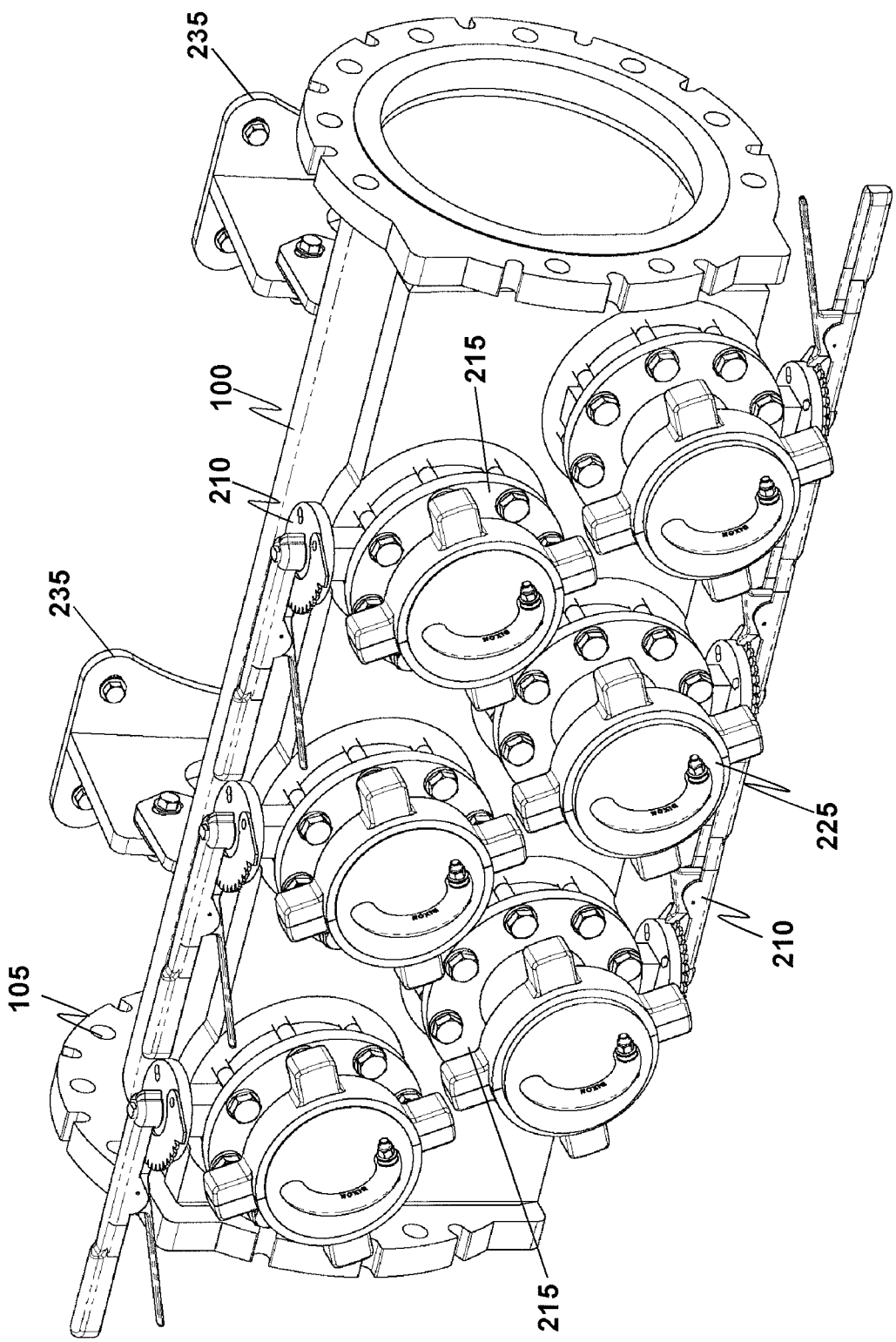
FIG. 2A illustrates an assembled manifold comprising the base section of FIG. 1, according to an embodiment of the present invention.

FIG. 2A illustrates a partially assembled manifold comprising the base section of FIG. 1, according to an embodiment of the present invention. Overtop of the ports 125 are affixed respective valves (e.g. butterfly valves) 210, and hammer unions 215. Preferably the valve is located between the hammer union and the port. The valve is connected directly to the port and flat face of the front plate 120. Bolts 220, fitted into the threaded holes 127 are used to secure the valves 210 and hammer unions 215 over their respective ports 125, such that apertures of the valves and hammer unions align with the apertures 125 to allow smooth fluid flow. Other removable or non-removable attaching means can alternatively be used. Caps 225 are shown covering the hammer union apertures, however in operation at least some of the caps may be removed and the hammer unions instead connected to pipes or hoses.

A butterfly valve (not shown) may be provided and affixed to the flange 105 by bolts. A further section of the manifold or another pipe or fluid-carrying body is coupled to the other side of the butterfly valve. Another valve, end cap, or manifold section can similarly be affixed to the flange 110 by bolts. Mounting brackets 235 are connected (e.g. bolted) to the mounting brackets 130 and further affixed to an anchoring body, such as a blender chassis.

Not shown in FIG. 2A are the wear-resistant inserts. These are illustrated in FIGS. 3A to 5.

Figure 2B:
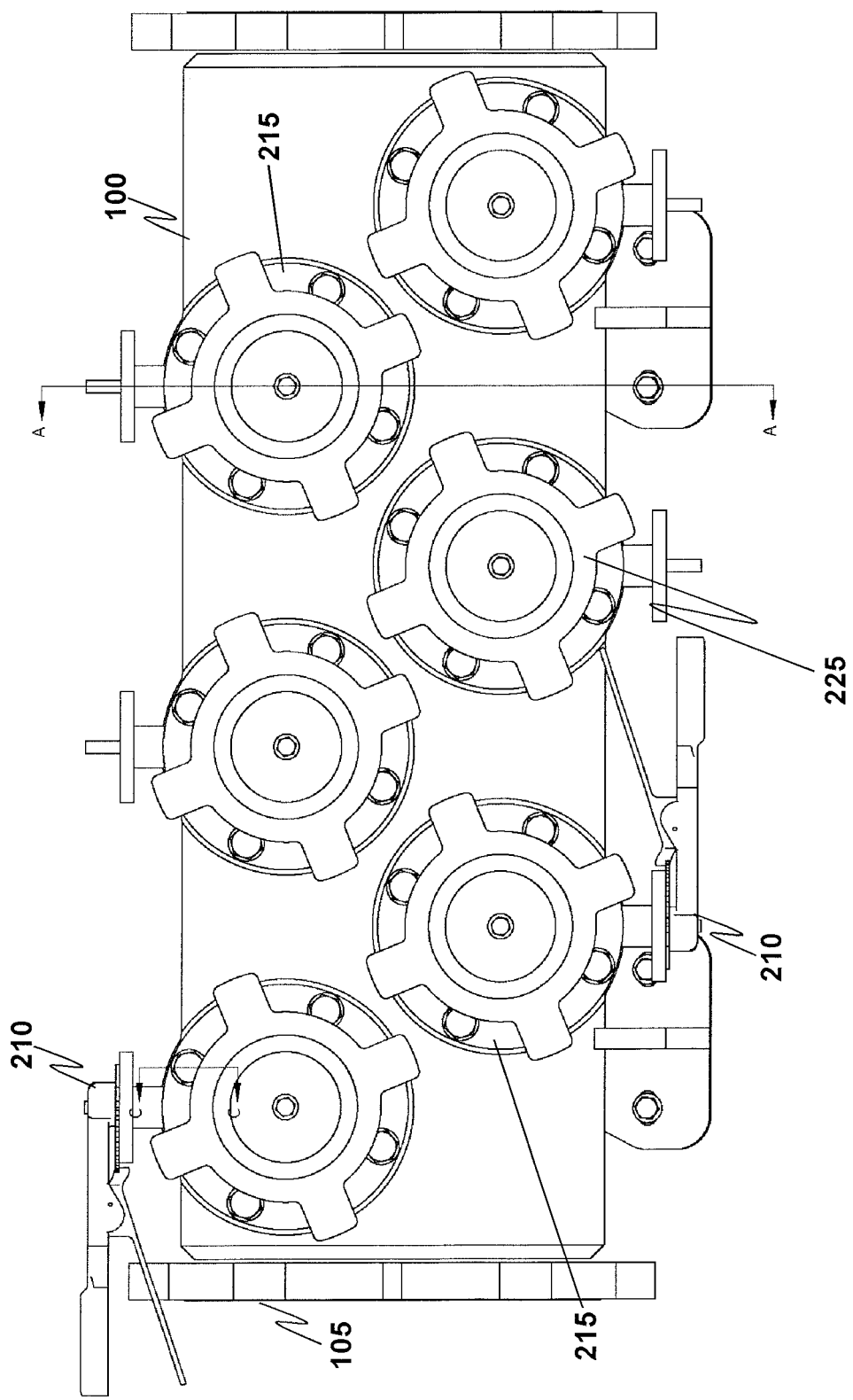
FIG. 2B illustrates a front view of the assembled manifold of FIG. 2A.

FIG. 2B illustrates a front view of the assembled manifold of FIG. 2A. Also illustrated is a section line A-A.

Figure 3A:
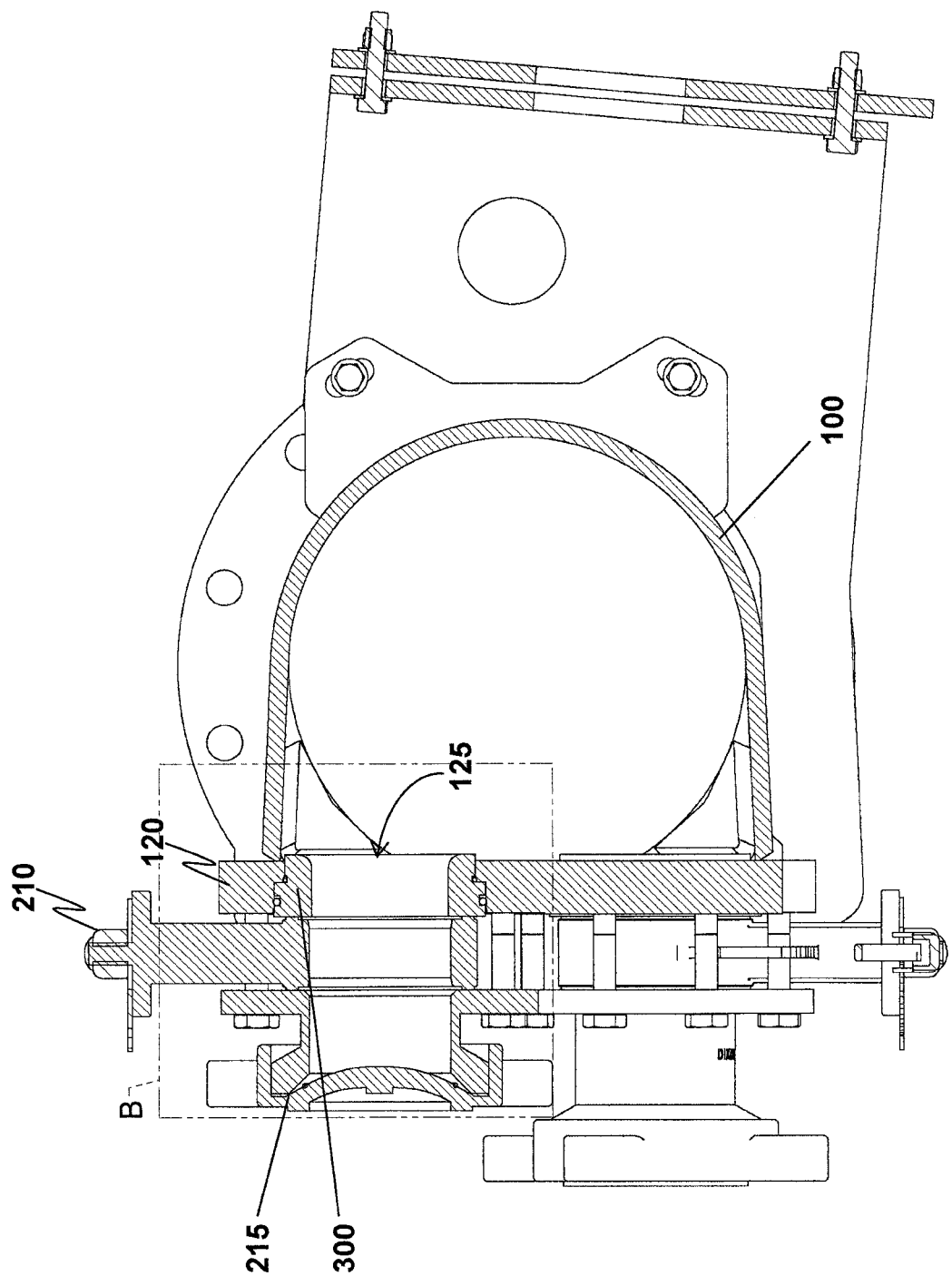
FIG. 3A illustrates an end, cross-sectional view of the manifold of FIG. 2B, along the section line A-A of FIG. 2B.
Figure 3B:
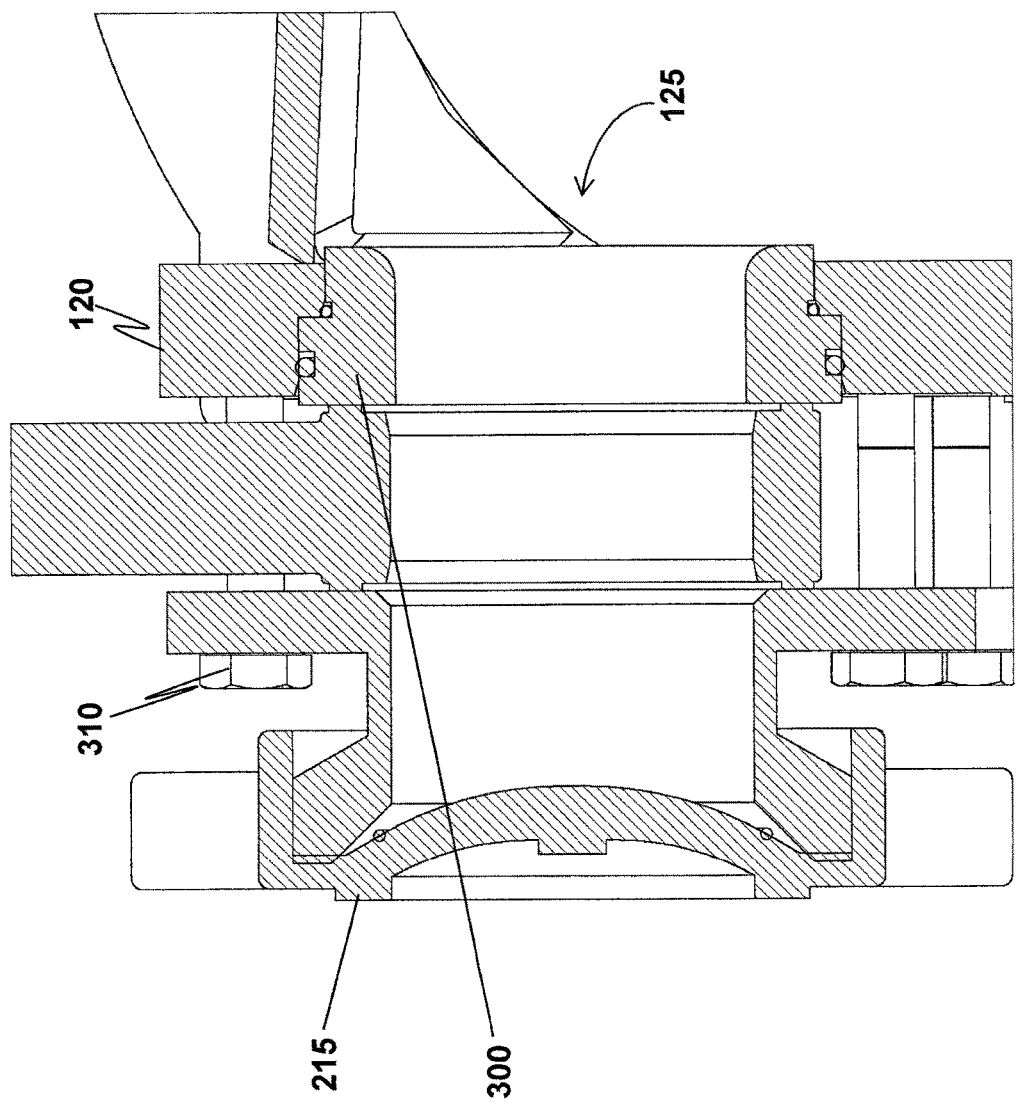
FIG. 3B illustrates an enlarged portion of the cross section of FIG. 3A, within the detail box B of FIG. 3A.
Figure 3C:
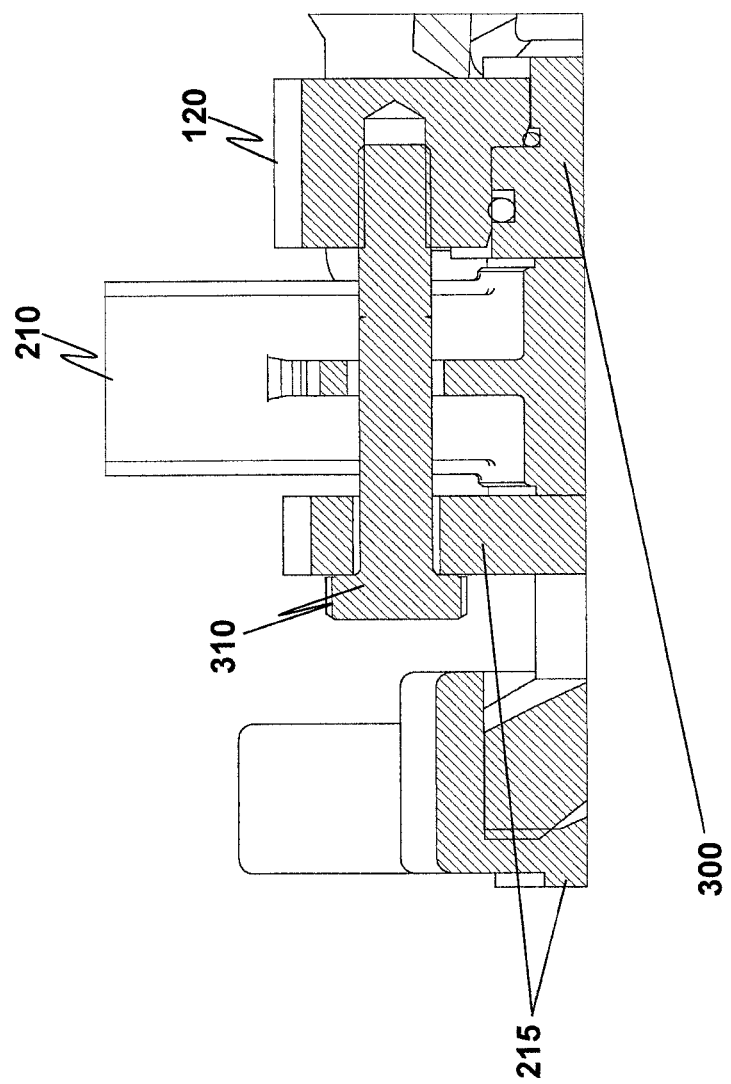
FIG. 3C illustrates further cross-sectional detail of FIG. 3B, including the bolting together of components onto the manifold.

FIG. 3A illustrates an end, cross-sectional view of the manifold of FIGS. 2A and 2B, particularly along the section line A-A. Also illustrated in FIG. 3A is a detail box B, with FIG. 3B illustrating contents of the detail box B. FIG. 3C further illustrates a portion of FIGS. 3A and 3B. In particular, FIG. 3C illustrates a further cross section of a portion of FIGS. 3A and 3B taken through one of the bolts 310 which couples the valve 210 and hammer union 215 to the front plate 120.

Figure 4:
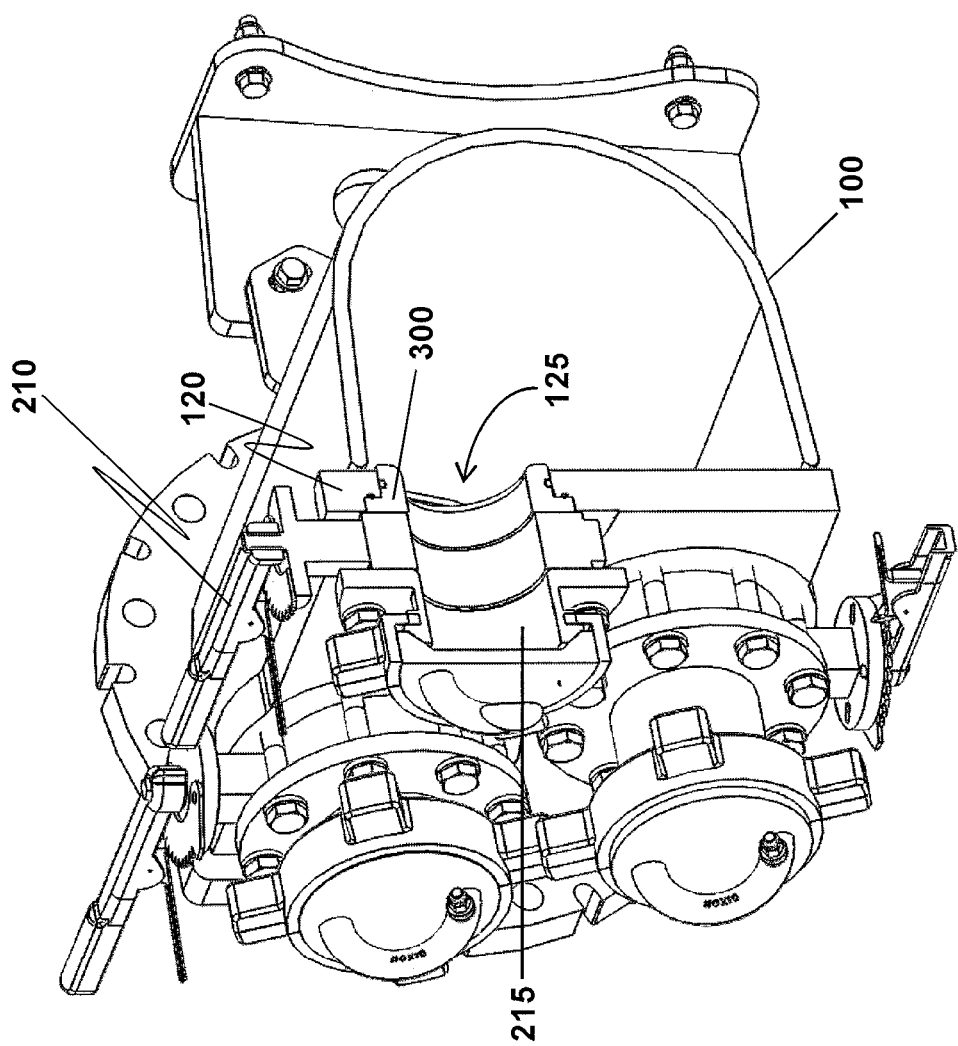
FIG. 4 illustrates a perspective cross-sectional view of the manifold of FIG. 2A.

FIG. 4 illustrates a perspective cross-sectional view of the manifold of FIGS. 2A and 2B, the cross section being taken through one of the ports. The body 100 with flat front plate 120 and curved remaining portion is shown. A wear-resistant insert 300 is shown in cross-section as being fitted into an aperture (port) 125. Each of the other apertures 125 may have a similar insert fitted therein. The inserts may be generally cylindrical and themselves have apertures (e.g. circular or other shaped) formed therein. A respective valve 210 and hammer union 215 are also shown in cross section. Interior apertures of the insert 300, valve 210 and hammer union 215 together form a contiguous, (e.g. generally cylindrical) fluid channel connecting to the interior cavity of the manifold. Holes in the hammer union 215 and valve 210 are aligned with threaded holes 127, and bolts fitted therein and tightened to sealingly engage the valve and hammer union with the port 125.

Figure 5:
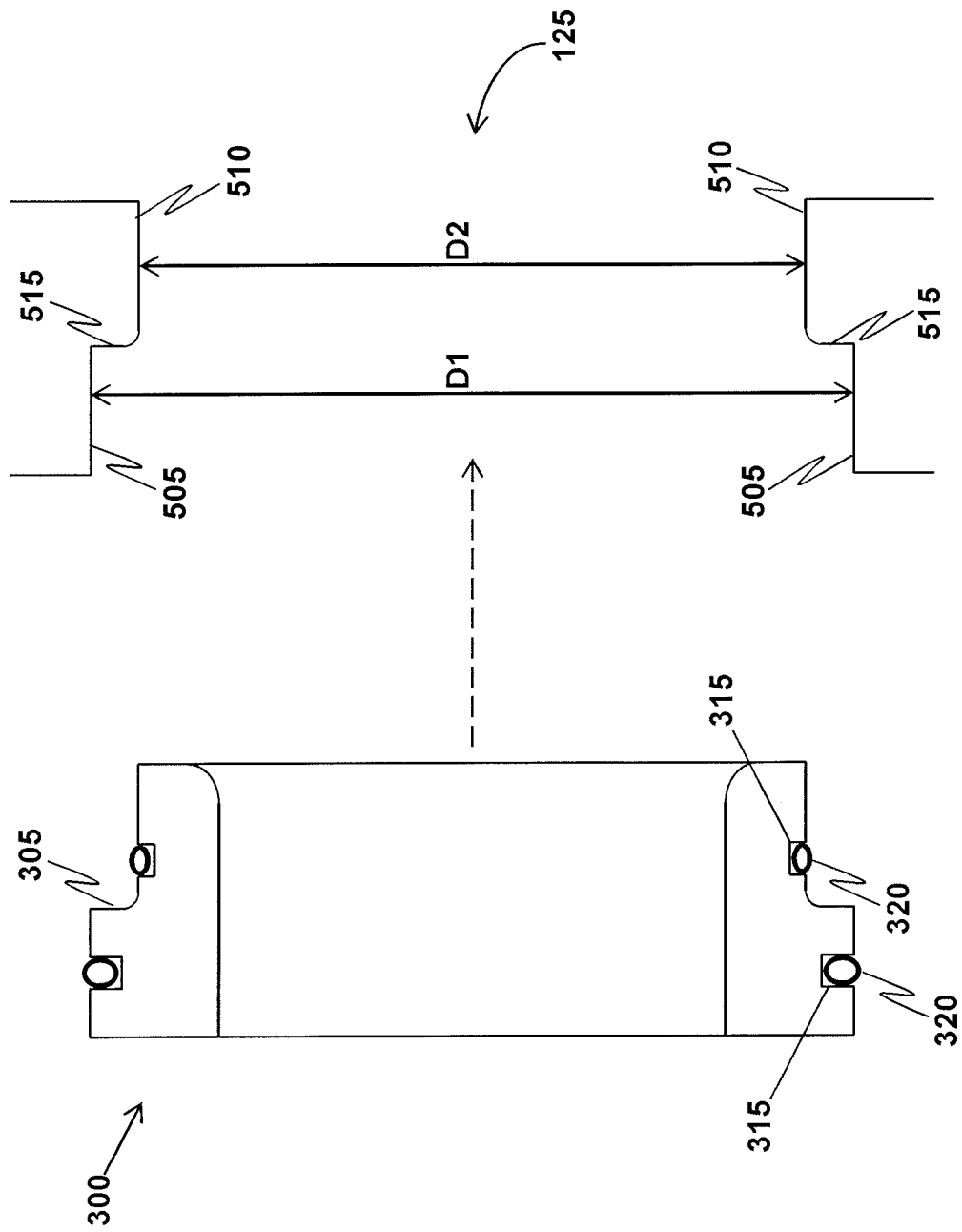
FIG. 5 illustrates a cross-sectional view of a port and insert portion of FIGS. 3A and 4.

FIG. 5 illustrates an enlarged, cross-sectional view of a port 125 and insert portion 300. An outer portion of the port has a first diameter D1 while an inner portion of the port has a second, smaller diameter D2. The sidewall of the port has outer and inner sections 505, 510 respectively for providing the first and second diameters. A step or seat 515 connects the outer and inner sections 505, 510. Alternatively, the sidewall can be formed of multiple steps, or a tapered surface (forming a conical aperture with corresponding conical insert), or a combination thereof. As such, the sidewall may include an annular ridge located partway along the sidewall or at an interior end of the sidewall, the purpose of the ridge being to retain the insert within the port by blocking the insert from falling in to the manifold's main cavity.

The insert 300 is configured to fittingly engage with the sidewalls of the port 125. As illustrated, the insert 300 is also stepped has a first generally cylindrical portion having a first diameter of about D1 and a second generally cylindrical portion having a second diameter of about D2. A face 305 engages with the step or seat 515 upon fitting of the insert into the port. The insert further has one or more grooves 315 in cylindrical outer surfaces thereof. O-rings 320 or other sealing devices are fitted into the grooves 315.

Figure 6:
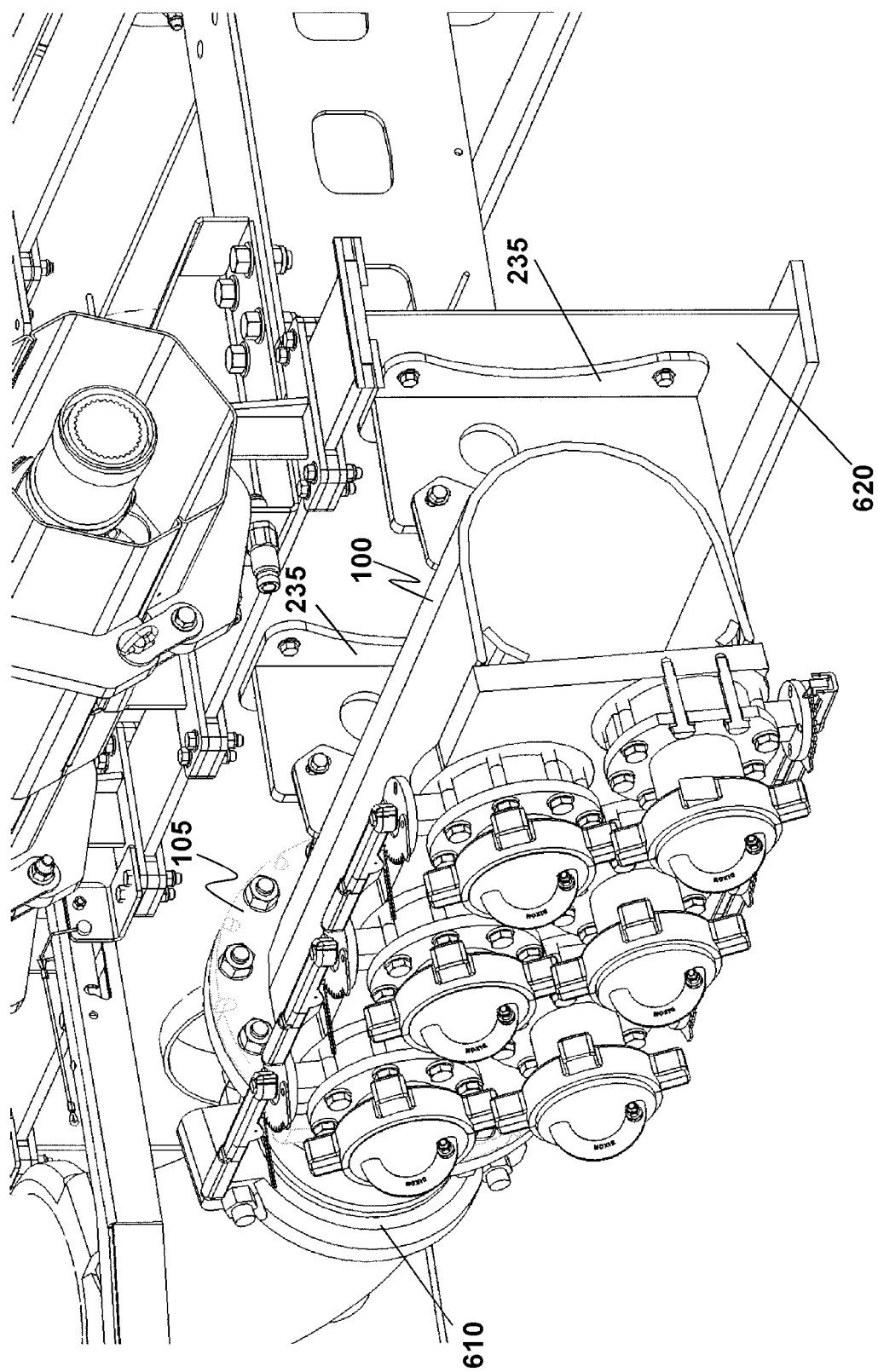
FIG. 6 illustrates the manifold of FIG. 2A fitted to a blender or other structure.

FIG. 6 illustrates the manifold of FIG. 2 fitted to a blender or other structure. The mounting brackets 235 are affixed to a chassis 620, while a pipe 610 is coupled to the hollow body 100 via the flange 105 and a valve. The pipe 610 can also include a flange and be bolted to or otherwise attached to the flange 105.

Figure 7:
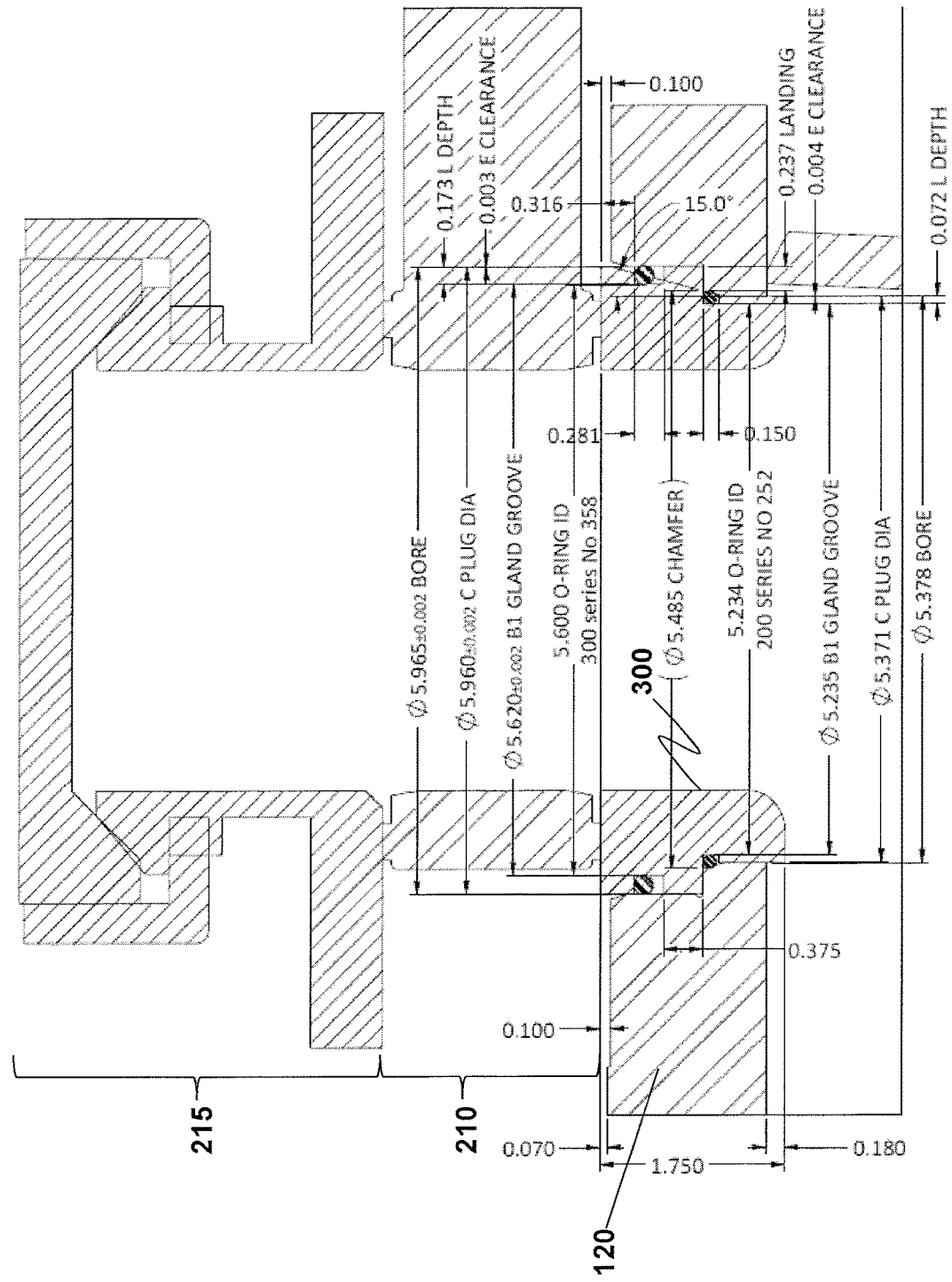
FIG. 7 is a cross-sectional engineering drawing of an assembled manifold port, according to an embodiment of the present invention.

FIG. 7 is a cross-sectional engineering drawing of an assembled manifold port portion, according to an example embodiment of the present invention. Illustrated in particular are the front plate 120, insert 300, valve 210 and hammer union 215, all surrounding the port 125. The diameter of the port may be about 5 to 6 inches in some embodiments. Example dimensions are in inches.

Figure 8:
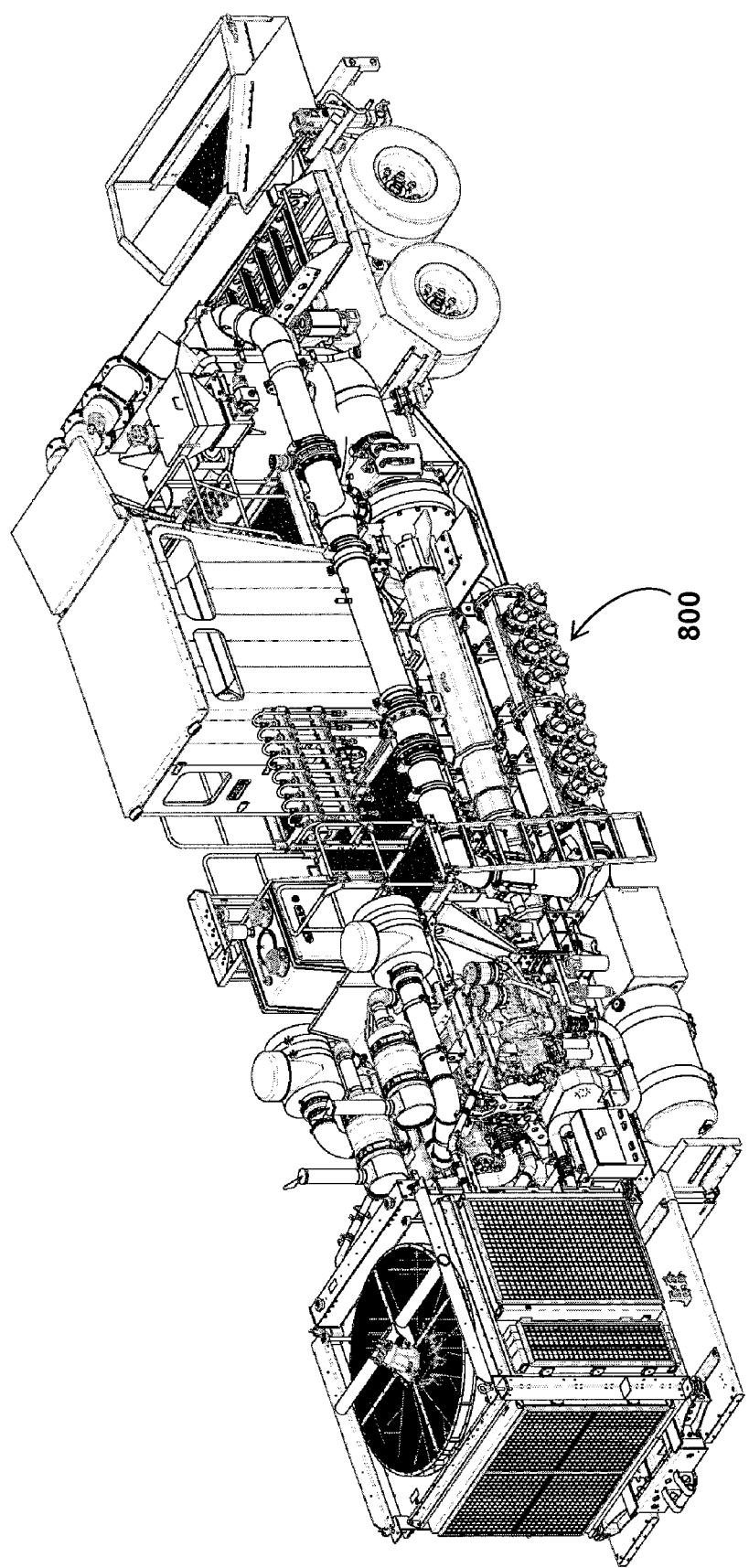
FIG. 8 is a blender comprising a manifold provided according to an embodiment of the present invention.

FIG. 8 is a blender comprising a manifold 800 provided according to an embodiment of the present invention.

Figure 9A:
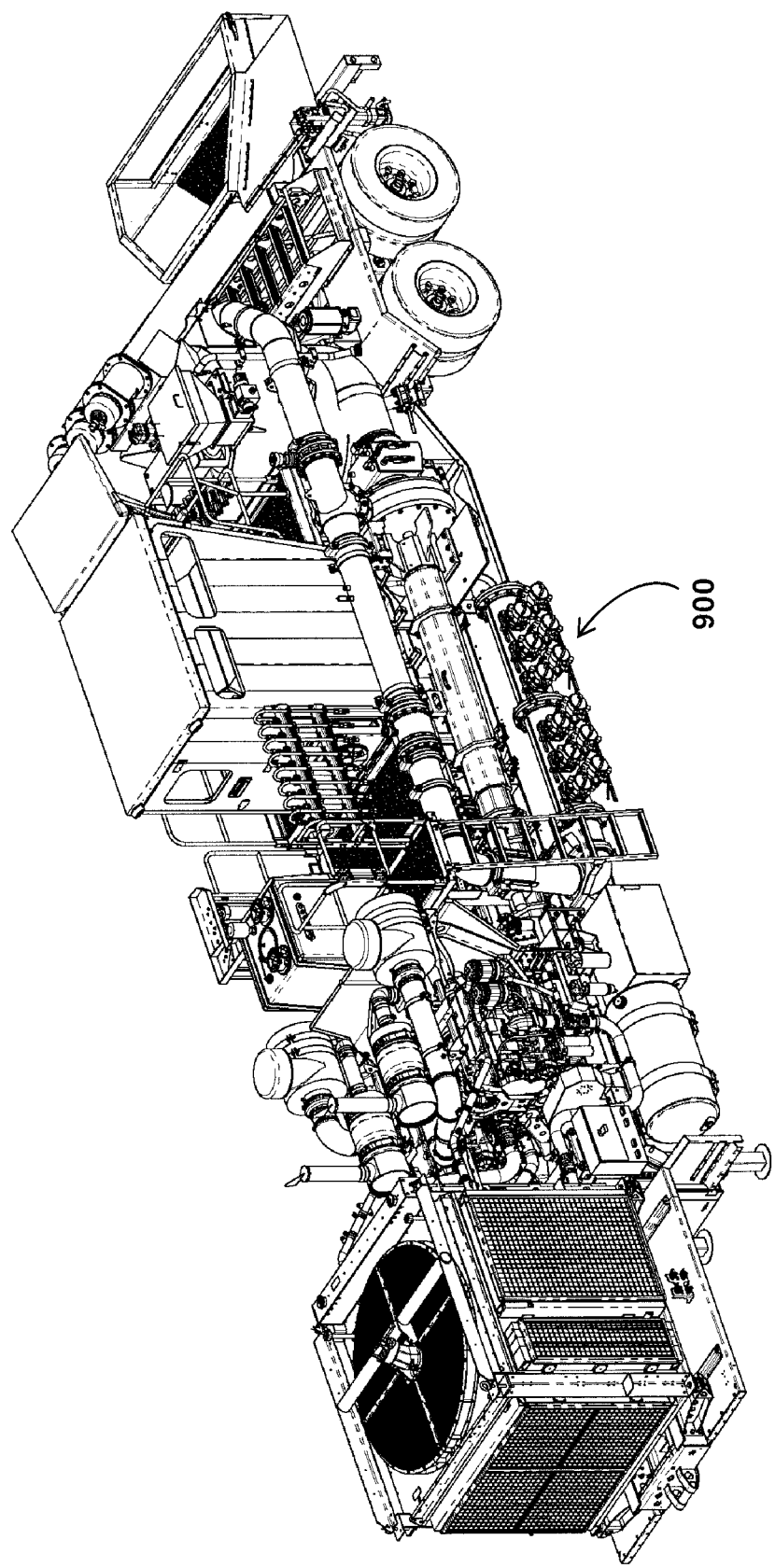
FIG. 9A is a blender comprising a manifold provided according to the prior art.

FIG. 9A is a blender comprising a manifold provided according to the prior art. The manifold includes a circular pipe having several ports and short pipe sections welded to the ports.

Figure 9B:
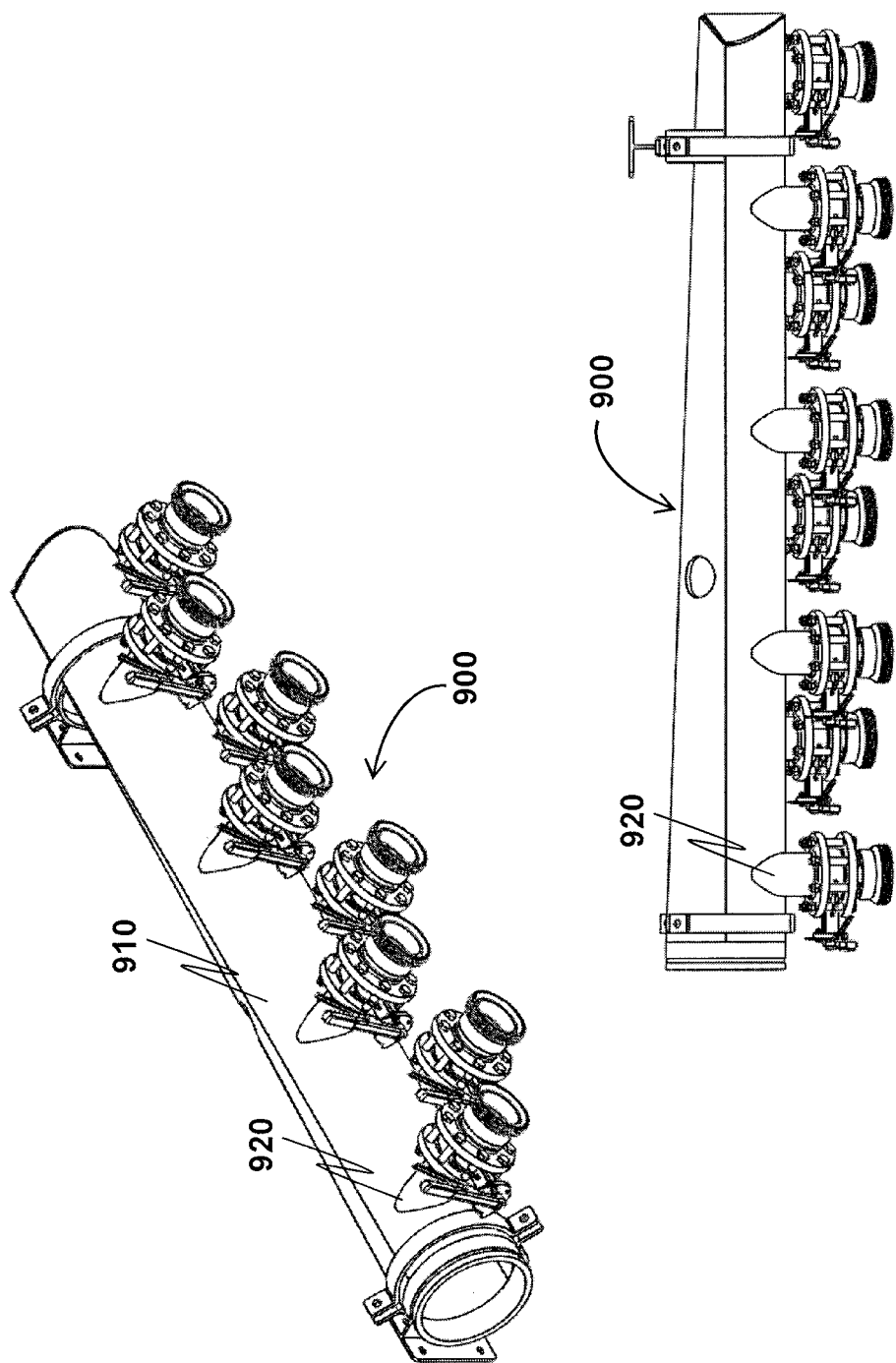
FIG. 9B is a manifold provided according to the prior art.

FIG. 9B illustrates several views of an example prior art manifold mountable to the blender of FIG. 9A. FIG. 9B more shows the circular pipe 910 with short pipe sections 920 welded to ports.

Embodiments of the present invention provide a modular manifold design that is simple and inexpensive to manufacture. The modular design comprises multiple shorter sections of component material to be formed into component parts of the manifold. Modularity may be provided for in that multiple different manifold apparatuses are substantially identical and interchangeable with one another. Modularity may be provided for in that components of each manifold apparatus are removable and replaceable by virtue of them being bolted on or otherwise removably attached.

The manufacturing can include rolling and burning of metal components, including the front portion (e.g. plate). The rolling comprises passing metal stock through pairs of rolls to create a sheet of uniform thickness. Various other standard metalworking practices may also be employed. These shorter sections are simpler to manufacture in a wider array of manufacturing equipment. In various embodiments, the flat front face of the plate is readily prepared, e.g. by burning and drilling and is easier to work with. The thickness of a plate forming the flat front face readily allows for the threaded holes 127 and supports bolted-on components.

In various embodiments, the inserts can potentially improve durability of the manifold in a variety of ways. The inserts 300 can be made of hardened steel (or another wear-resistant material suitable to the environment) and/or coated for durability. All of the removable components, including the inserts, valves and hammer unions, can be readily removed and replaced in the field. Furthermore, these components, particularly the inserts, but also the valves and hammer unions, can be rotated in response to uneven wear along one section, thereby increasing the lifetime of the components. In some embodiments, the inserts are indexed to allow a certain number of rotational positions. To facilitate this, in some embodiments, the insert outer shape, and corresponding port shape, can be circular or regular polygonal.

In various embodiments, the front portion (e.g. plate 120) can be adequately thick so as to be resilient to erosion, wear, and washouts. The inside of this front portion and/or other components surrounding the manifold's main cavity (e.g. C-shaped back bowl) can also be coated prior to fabrication.

In some embodiments, a manifold section, such as is illustrated in FIG. 2, can be symmetric in that the entire manifold section can be removed and rotated by 180° ("flipped") so that the flange 105 is located in place of the flange 110 and vice versa. The manifold section can then be replaced in this new rotated configuration. This flipping of the manifold section can be performed in order to address uneven wear within the manifold, thereby prolonging life. More particularly, the symmetry is a 180° rotational symmetry about an axis which passes through a centre of the manifold section 10 which is perpendicular to the plane within which the front plate 120 is disposed.

In some embodiments, multiple manifold sections such as illustrated in FIG. 2, are used together. For example multiple such manifold sections may be used in the same intake (suction-side) manifold, the same discharge-side manifold, or both, of an apparatus such as a blender unit. Such manifold sections can be bolted directly together or used at different, spaced-apart locations. Therefore, the manifold sections can be interchanged with each other in response to uneven wear. For example, parts of the intake manifold, which wear more slowly, may be swapped with parts of the discharge manifold, which wear more quickly. Furthermore, this may facilitate a reduced requirement for the number of spare parts kept on hand.

The two apertures 107, 112 shown in FIG. 1 facilitate interchangeability and reconfiguration (via rotation) of the manifold sections. In particular, a first one of the apertures can be capped when it is located at a terminus of a manifold. Otherwise, when the manifold section is rotated, the first one of the apertures can be uncapped and the other one of the apertures can be capped instead. When the manifold section is not located at a terminus of the manifold, both apertures can be uncapped and connected to other units. This may occur for example when the manifold section is connected between two other manifold sections, or between a pipe and another manifold section. Thus, this configuration provides for a universality or modularity of the manifold part.

In some embodiments, efficiency can be provided for in the following manner. First, inserts can be shaped in such a way as to improve flow dynamics. For example the inserts may comprise mitered or radiused inlets. The inlets may be flared, for example. As another example, the inserts may have a scooped or directional shape. As yet another example, the inserts may have particular lengths or depths which are selected based on flow dynamics considerations. In some embodiments, the inserts may be elongated so that a portion thereof protrudes into an interior of the manifold's cavity. In some embodiments, inserts may also be designed to optimize for certain fluid characteristics, such as viscosity, temperature, suspended aggregates, or other fluid variable. For example, the size and shape of the inserts may be configured to allow for desired fluid flow characteristics. The inserts may be sized and shaped to optimize a flow characteristic of fluids or slurries as they transition from the manifold's interior cavity to the ports.

In some embodiments, the lack of header pipes, relative to the prior art, allows for a reduced width of the manifold thereby using available space more efficiently.

In some embodiments, serviceability and maintenance are improved in one or more of the following manners. The manifold can be fitted with a removable end cap, removal of which allows for easy access and inspection of the manifold interior. The use of multiple short manifold sections facilitates easier handling during assembly and service. The inserts can be accessed removed rotated and replaced from the front of the manifold, without removal of the entire manifold. The manifold can be provided with slotted, profile-matched mounting brackets to allow for ease of placement alignment and installation to the host chassis. The manifold, and portions thereof, can be constructed using jigs and fixtures to facilitate proper fit of replacement manifolds or parts thereof.

Although the present invention has been described primarily with respect to a manifold to be mounted on a hydraulic fracturing blender unit, it should be understood that the invention can also be mounted to other devices that handle potentially abrasive fluids. Such devices can include oil and gas equipment or other equipment. For example, the manifold can be used as part of other oil and gas equipment, such as mud pump manifolds, hydraulic fracturing (frac) pump suction manifolds, high-pressure frac missiles. The manifold can also be used in other equipment that handles slurries, such as in dredging, mining, tunneling, and construction (e.g. hydrovac-excavation) equipment.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A fluid-carrying manifold apparatus comprising:
a body having an interior cavity, the body comprising a front portion having a face;
two or more ports formed in the front portion and communicating with the interior cavity;
one or more components, each being attached to the front portion overtop of a respective one of the two or more ports; and
one or more inserts each respectively fitted within said respective one or another respective one of the two or more ports and held in place therein,
the interior cavity having a longitudinal axis,
a cross-section of the interior cavity, in a plane perpendicular to the longitudinal axis, is larger than respective cross-sections of the ports, each of the ports defining a respective port axis, each of the port axes defining a respective angle with respect to the longitudinal axis of the interior cavity, so that fluid flow through a port and then along a flow bore of the interior cavity requires at least one change in fluid flow direction, and at least one of the one or more inserts extends from within one of the ports and protrudes into the flow bore of the interior cavity.

2. The apparatus of claim 1, wherein the one or more components include one or more valves, unions, process connections, blind flanges, blanking plugs, or combinations thereof.

3. The apparatus of claim 1, wherein the one or more inserts are fabricated of hardened or coated steel, manganese steel, tungsten carbide, ceramic, engineered plastic, or other wear-resistant material or combination of materials.

4. The apparatus of claim 1, further comprising one or more fluid seals in contact with the one or more inserts.

5. The apparatus of claim 4, wherein each of the one or more fluid seals is fitted onto a corresponding one of the one or more inserts.

6. The apparatus of claim 1, wherein the body further comprises one or more apertures communicating with the interior cavity and located in one or more portions of the body other than the front portion, the fluid-carrying manifold thereby configured to conduct fluid between the two or more ports and at least one of the one or more apertures via the interior cavity.

7. The apparatus of claim 1, wherein the one or more inserts are shaped to optimize a flow characteristic of fluids or slurries as said fluids or slurries flow from the interior cavity to the two or more ports.

8. The apparatus of claim 1, wherein the one or more inserts each includes an end portion that protrudes into the interior cavity of the manifold, the end portion having an exterior surface which is exposed to the interior of the cavity.

9. The apparatus of claim 1, wherein at least one of the one or more inserts is rotatable, between a first operating position and a second operating position, within said respective one or said other respective one of the two or more ports.

10. The apparatus of claim 1, wherein the one or more inserts are removable and replaceable.

11. The apparatus of claim 1, wherein the one or more inserts comprises at least two inserts which are interchangeable with each other.

12. The apparatus of claim 1, wherein the fluid-carrying manifold apparatus is symmetric such that removal, 180° rotation and reconnection of the fluid-carrying manifold apparatus results in a substantially same operability of the fluid-carrying manifold apparatus.

13. The apparatus of claim 1, wherein at least one of the one or more components are removably attached to the front portion.

14. The apparatus of claim 1, wherein the front portion comprises a machined cavity configured to receive the one or more inserts and the front portion further comprises one or more further apertures configured as fastening points of the one or more components.

15. The apparatus of claim 1, wherein a minimum distance between the face and the interior cavity is configured to correspond to a length of a corresponding one of the one or more inserts.

16. The apparatus of claim 1, wherein the front portion has a flat face.

17. The apparatus of claim 1, wherein the one or more components are attached directly, at one or more fastening points, to the front portion overtop of the one or more ports, said one or more fastening points being spaced apart from the ports.

18. A manifold assembly comprising at least two interchangeable fluid-carrying manifold apparatuses each as specified in claim 1.

19. A machine comprising a fluid-carrying manifold apparatus comprising:

a body having an interior cavity, the body comprising a front portion having a face;

two or more ports formed in the front portion and communicating with the interior cavity;

one or more components, each being attached to the front portion overtop of a respective one of the two or more ports; and one or more inserts each respectively fitted within said respective one or another respective one of the two or more ports and held in place therein, the interior cavity having a longitudinal axis, a cross-section of the interior cavity, in a plane perpendicular to the longitudinal axis, is larger than respective cross-sections of the ports, each of the ports defining a respective port axis, each of the port axes defining a respective angle with respect to the longitudinal axis of the interior cavity, so that fluid flow through a port and then along a flow bore of the interior cavity requires at least one change in fluid flow direction, and at least one of the one or more inserts extends from within one of the ports and protrudes into the flow bore of the interior cavity.

20. The machine of claim 19, further comprising a second fluid-carrying manifold apparatus comprising:

a second body having a second interior cavity, the second body comprising a second front portion having a second face;

one or more second ports formed in the second front portion and communicating with the second interior cavity;

one or more second components attached to the second front portion overtop of the one or more second ports; and one or more second inserts respectively fitted within the one or more second ports and held in place therein, the first fluid-carrying manifold apparatus and the second fluid-carrying manifold apparatus being interchangeable.

21. The machine of claim 20, wherein the first fluid-carrying manifold apparatus belongs to an intake manifold of the machine, and the second fluid-carrying manifold apparatus belongs to a discharge-side manifold of the machine.

* * * * *